(12) United States Patent
Mohan et al.

(10) Patent No.: US 10,178,737 B2
(45) Date of Patent: Jan. 8, 2019

(54) MONITORING OCCUPANCY OF A DESKTOP WITH A DESKTOP APPARATUS

(71) Applicant: enLighted, Inc., Sunnyvale, CA (US)

(72) Inventors: Tanuj Mohan, Mountain View, CA (US); Satprit Duggal, San Carlos, CA (US)

(73) Assignee: Enlighted, Inc., Sunnyvale, CA (US)

( * ) Notice: Subject to any disclaimer, the term of this patent is extended or adjusted under 35 U.S.C. 154(b) by 0 days.

(21) Appl. No.: 15/899,487

(22) Filed: Feb. 20, 2018

(65) Prior Publication Data

US 2018/0177024 A1    Jun. 21, 2018

Related U.S. Application Data

(63) Continuation-in-part of application No. 15/405,198, filed on Jan. 12, 2017, which is a continuation of application No. 15/089,497, filed on Apr. 2, 2016, now Pat. No. 9,585,227.

(51) Int. Cl.
    *H05B 37/02*      (2006.01)
    *G01S 5/16*       (2006.01)
    *G01S 5/00*       (2006.01)

(52) U.S. Cl.
    CPC ........ *H05B 37/0218* (2013.01); *G01S 5/0027* (2013.01); *G01S 5/16* (2013.01); *H05B 37/0227* (2013.01); *H05B 37/0245* (2013.01); *H05B 37/0272* (2013.01); *Y02B 20/46* (2013.01)

(58) Field of Classification Search
    CPC ..... G01S 5/0027; G01S 5/16; H05B 37/0218; H05B 37/0227; H05B 37/9245; H05B 37/0272; Y02B 20/46
    See application file for complete search history.

(56) References Cited

U.S. PATENT DOCUMENTS

| | | |
|---|---|---|
| 5,101,141 A | 3/1992 | Warner et al. |
| 5,179,324 A | 1/1993 | Audbert |
| 5,191,265 A | 3/1993 | D'Aleo et al. |
| 5,283,516 A | 2/1994 | Lohoff |
| 5,455,487 A | 10/1995 | Mix et al. |
| 5,598,042 A | 1/1997 | Mix et al. |
| 5,668,446 A | 9/1997 | Baker |
| 5,812,422 A | 9/1998 | Lyons |
| 5,962,989 A | 10/1999 | Baker |
| 5,971,597 A | 10/1999 | Baldwin et al. |
| 6,057,654 A | 5/2000 | Cousy et al. |

(Continued)

FOREIGN PATENT DOCUMENTS

WO    WO2016-026979    2/2016

*Primary Examiner* — Alexander H Taningco
*Assistant Examiner* — Kurtis R Bahr

(57) ABSTRACT

An apparatuses, methods and systems for a desktop occupancy sensing device are disclosed. One desktop apparatus includes an occupancy sensor, a mobile device charging interface, a controller, and a structure. The occupancy sensor operates to sense occupancy proximate to the desktop apparatus. The controller operates to determine occupancy of a desktop based on the sensed occupation, and the controller operates to communicate the determined occupancy to an upstream network. The occupancy sensor, the mobile device charging interface, and an interface to the upstream network are disposed within the structure as a single unit, and the structure is adapted to be placed on or affixed to the desktop.

16 Claims, 9 Drawing Sheets

(56) References Cited

U.S. PATENT DOCUMENTS

| | | |
|---|---|---|
| 6,188,181 B1 | 2/2001 | Sinha et al. |
| 6,285,912 B1 | 9/2001 | Ellison et al. |
| 6,342,994 B1 | 1/2002 | Cousy et al. |
| 6,492,897 B1 | 12/2002 | Mowery, Jr. |
| 6,548,967 B1 | 4/2003 | Dowling et al. |
| 6,731,024 B1 * | 5/2004 | Molnar .............. H01R 13/6666 307/116 |
| 6,763,013 B2 | 7/2004 | Kennedy |
| 6,786,954 B1 | 9/2004 | Lee et al. |
| 6,909,921 B1 | 6/2005 | Bilger |
| 7,045,968 B1 | 5/2006 | Bierman et al. |
| 7,047,092 B2 | 5/2006 | Wimsatt |
| 7,164,972 B2 | 1/2007 | Imhof et al. |
| 7,167,094 B2 | 1/2007 | Ciarcia et al. |
| 7,190,126 B1 | 3/2007 | Paton |
| 7,297,929 B2 | 11/2007 | Cernasov et al. |
| 7,309,965 B2 | 12/2007 | Dowling et al. |
| 7,309,985 B2 | 12/2007 | Eggers et al. |
| 7,345,998 B2 | 3/2008 | Cregg et al. |
| 7,348,736 B2 | 3/2008 | Piepgras et al. |
| 7,437,596 B2 | 10/2008 | McFarland |
| 7,382,271 B2 | 12/2008 | McFarland |
| 7,468,666 B2 | 12/2008 | Clarcia et al. |
| 7,550,931 B2 | 6/2009 | Lys et al. |
| 7,566,137 B2 | 7/2009 | Veskovic |
| 7,623,042 B2 | 11/2009 | Huizenga |
| 7,626,339 B2 | 12/2009 | Paton |
| 7,664,574 B2 | 2/2010 | Imhof et al. |
| 7,788,189 B2 | 8/2010 | Budike, Jr. |
| 7,792,956 B2 | 9/2010 | Choong et al. |
| 7,812,543 B2 | 10/2010 | Budike, Jr. |
| 7,925,384 B2 | 4/2011 | Huizenga et al. |
| 8,264,168 B2 | 9/2012 | Feri et al. |
| 8,368,321 B2 | 2/2013 | Chemel et al. |
| 8,457,793 B2 | 6/2013 | Golding et al. |
| 8,587,225 B2 | 11/2013 | Ashar et al. |
| 8,712,686 B2 | 4/2014 | Bandyopadhyay et al. |
| 8,787,944 B2 | 7/2014 | Smith |
| 8,796,958 B2 | 8/2014 | Billig et al. |
| 8,994,295 B2 | 3/2015 | Mohan et al. |
| 9,006,996 B2 | 4/2015 | Mohan et al. |
| 9,240,111 B2 | 1/2016 | Scott et al. |
| 9,271,375 B2 | 2/2016 | Balasubramanian |
| 9,442,017 B2 | 9/2016 | Read |
| 9,485,623 B2 | 11/2016 | Smith et al. |
| 9,532,435 B2 | 12/2016 | Leinen |
| 9,900,556 B1 * | 2/2018 | Scanlon .................. H04N 7/157 |
| 2004/0002792 A1 | 10/2004 | Hoffknecht |
| 2005/0169643 A1 | 8/2005 | Franklin et al. |
| 2005/0231112 A1 | 10/2005 | Woo et al. |
| 2006/0127034 A1 * | 6/2006 | Brooking .............. H04N 5/765 386/231 |
| 2006/0244387 A1 | 11/2006 | Park et al. |
| 2006/0275040 A1 | 12/2006 | Franklin |
| 2007/0057807 A1 | 3/2007 | Walters et al. |
| 2007/0061050 A1 | 3/2007 | Hoffknecht |
| 2007/0086128 A1 | 4/2007 | Lane et al. |
| 2007/0215794 A1 | 9/2007 | Cernasov et al. |
| 2007/0291483 A1 | 12/2007 | Lys |
| 2008/0089658 A1 * | 4/2008 | Grady .................... H04N 5/225 386/200 |
| 2008/0185597 A1 | 8/2008 | Veskovic et al. |
| 2008/0244104 A1 | 10/2008 | Clemente |
| 2008/0265796 A1 | 10/2008 | Null |
| 2009/0026966 A1 | 1/2009 | Budde et al. |
| 2009/0179596 A1 | 7/2009 | Willaert et al. |
| 2009/0195161 A1 | 8/2009 | Lane et al. |
| 2009/0267540 A1 | 10/2009 | Chemel et al. |
| 2010/0026479 A1 | 2/2010 | Tran |
| 2010/0034386 A1 | 2/2010 | Choong et al. |
| 2010/0067715 A1 * | 3/2010 | Bibi ........................ H04B 3/54 381/77 |
| 2010/0135186 A1 | 6/2010 | Choong et al. |
| 2010/0264846 A1 | 10/2010 | Chemal et al. |
| 2010/0270933 A1 | 10/2010 | Chemal et al. |
| 2010/0280677 A1 | 11/2010 | Budike, Jr. |
| 2010/0295482 A1 | 11/2010 | Chemal et al. |
| 2010/0301770 A1 * | 12/2010 | Chemel ................ H05B 37/029 315/294 |
| 2010/0301777 A1 | 12/2010 | Chemal et al. |
| 2011/0031897 A1 | 2/2011 | Henig et al. |
| 2011/0199010 A1 | 8/2011 | Henig et al. |
| 2012/0130632 A1 | 5/2012 | Bandyopadhyay et al. |
| 2012/0169249 A1 | 7/2012 | Loveland et al. |
| 2012/0278640 A1 * | 11/2012 | Caglianone ........... G06F 1/3231 713/323 |
| 2012/0293075 A1 | 11/2012 | Engelen et al. |
| 2013/0102283 A1 | 4/2013 | Lau et al. |
| 2013/0141554 A1 | 6/2013 | Ganick et al. |
| 2013/0234607 A1 | 9/2013 | Kim et al. |
| 2013/0293877 A1 * | 11/2013 | Ramer ............... H05B 33/0842 356/213 |
| 2014/0207282 A1 * | 7/2014 | Angle .................. H04L 12/282 700/257 |
| 2014/0285095 A1 | 9/2014 | Chemel et al. |
| 2014/0313984 A1 | 10/2014 | Diamond |
| 2015/0008831 A1 | 1/2015 | Carrigan et al. |
| 2015/0048742 A1 | 2/2015 | Wingren |
| 2015/0076993 A1 | 3/2015 | Mohan |
| 2015/0120360 A1 * | 4/2015 | Adriaenssens ........... G01V 8/10 705/7.16 |
| 2015/0223309 A1 | 8/2015 | Mohan et al. |
| 2015/0281302 A1 | 10/2015 | Winston et al. |
| 2016/0122157 A1 | 5/2016 | Keser |
| 2016/0142877 A1 | 5/2016 | Gujral et al. |
| 2016/0300160 A1 | 10/2016 | Klein |
| 2017/0345290 A1 * | 11/2017 | Law ...................... G08C 23/04 |

* cited by examiner

Sensing, by an occupancy sensor of a desktop apparatus, occupancy of a desk top associated with the desktop apparatus

810

Receiving, by the desktop apparatus, a mobile device at a charging interface of the desktop apparatus

820

Communicating, by a controller of the desktop apparatus, the determined occupancy to an upstream network, wherein the occupancy sensor, the charging interface, and an interface to the upstream network are disposed within the structure as a single unit, and wherein the structure is adapted to be affixed to or placed on the desktop

MONITORING OCCUPANCY OF A DESKTOP WITH A DESKTOP APPARATUS

RELATED APPLICATION

This patent application is a continuation-in-part (CIP) of U.S. patent application Ser. No. 15/405,198, filed Jan. 12, 2017, which is continuation of U.S. patent application Ser. No. 15/089,497, filed Apr. 2, 2016.

FIELD OF THE EMBODIMENTS

The described embodiments relate generally to building control. More particularly, the described embodiments relate to a desktop apparatus for monitoring occupancy of a desktop.

BACKGROUND

Management of building resources includes controlling heating, lighting and other environment controls. Further, management of building resources includes managing occupancy of user resources, such as, desk and or cubicle availability. Hoteling is a term that has been used to refer to the use of desks and/or cubicles of an office space in which the user of occupant of the desk or cubicle changes.

It is desirable to have a method, system and apparatus for monitoring occupancy of a desktop.

SUMMARY

One embodiment includes a desktop apparatus. The desktop apparatus includes an occupancy sensor, a mobile device charging interface, a controller, and a structure. The occupancy sensor operates to sense occupancy proximate to the desktop apparatus. The controller operates to determine occupancy of a desktop based on the sensed occupation, and the controller operates to communicate the determined occupancy to an upstream network. The occupancy sensor, the mobile device charging interface, and an interface to the upstream network are disposed within the structure as a single unit, and the structure is adapted to be placed on or affixed to the desktop Another embodiment includes a method. The method includes sensing, by an occupancy sensor of a desktop apparatus, occupancy of a desk top associated with the desktop apparatus, receiving, by the desktop apparatus, a mobile device at a charging interface of the desktop apparatus, and communicating, by a controller of the desktop apparatus, the determined occupancy to an upstream network, wherein the occupancy sensor, the charging interface, and an interface to the upstream network are disposed within the structure as a single unit, and wherein the structure is adapted to be placed on or affixed to the desktop Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 8 is a flow chart that includes steps of a method, according to an embodiment.

DETAILED DESCRIPTION

Figure 1:
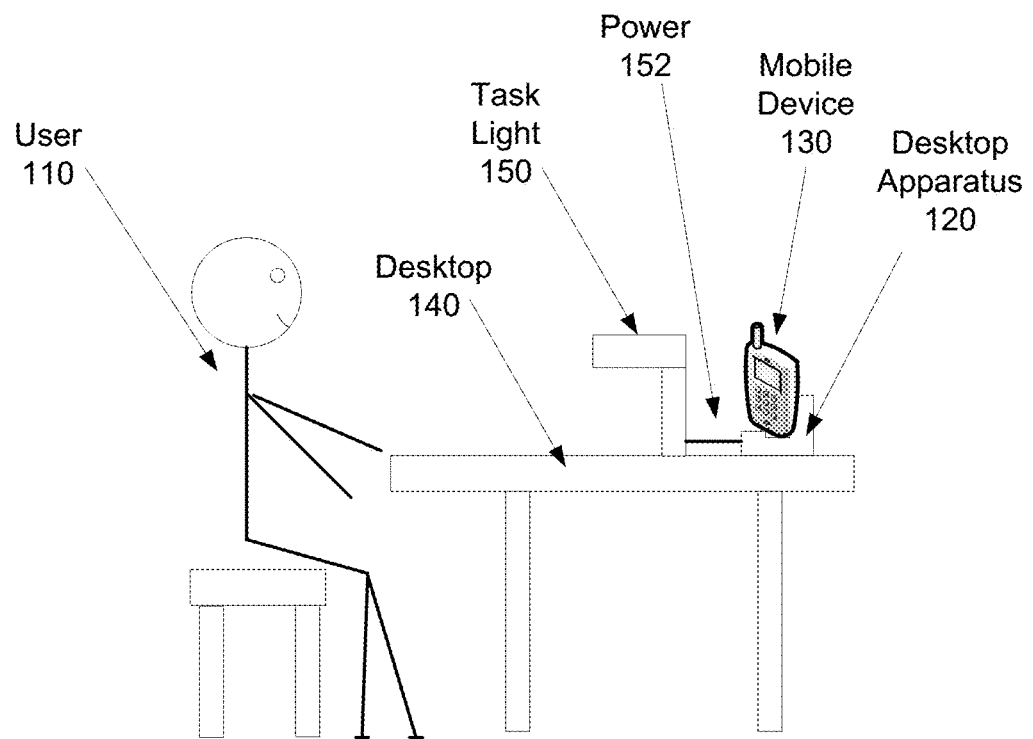
FIG. 1 shows a desktop that includes a desktop apparatus, according to an embodiment.

As shown in the drawings, the described embodiments are embodied in apparatuses, methods, and systems for monitoring occupancy of one or more desktops within a structure. An embodiment includes managing the one or more desktops using the monitored occupancy of the one or more desktops. Further, the monitored occupancy can be used to control environmental conditions of the structure. Further, the monitored occupancy can be used to track locations of users of the structure and/or users of the desktops. For at least some embodiments, the monitoring and tracking of the users is used for structure intelligence and control.

FIG. 1 shows a desktop 140 that includes a desktop apparatus 120, according to an embodiment. The desktop apparatus 120 includes an occupancy sensor for determining whether a user 110 is occupying the desktop 140. Sensing occupancy of the desktop can be advantageous because the sensed occupancy can be used for controlling power and/or environmental conditions of areas proximate to the desktop. For example, detection of occupancy can be used for selectively providing power, environmental control (lighting, temperature control, etc.) to areas of a structure associated with the desktops. Additionally, or alternatively, occupancy sensing can be used for supporting "hoteling" of desktops or cubicles associated with the desktops. The support can include, for example, directing users to unoccupied desktops or cubicles. Further, the support can additionally or alternatively include identifying users and directing users to preferred locations of desktops.

A problem with attaching an occupancy sensor to a desktop 140 is that generally users do not like the privacy invasion that an occupancy sensor poses. Further, if the occupancy sensor is knocked off of the desktop or damaged, the users do not have any personal motivation to support fixing or replacing the occupancy sensor. The described embodiments of the occupancy sensing includes a desktop apparatus 120 that includes a charging interface that provides a user with a way to charge a mobile device 130 of the user 110. Accordingly, the user 110 is motivated to occupy a desktop 140 that includes the desktop apparatus 120, and the user 110 is motivated to maintain the operation of the desktop apparatus 120 because the user can charge their mobile device 130 while occupying the desktop 140.

For at least some embodiments, the desktop apparatus 120 is affixed to the desktop 140. Affixing the desktop apparatus improves the likelihood that the desktop apparatus will not be removed. Another embodiment includes placing the desktop apparatus on the desktop.

For at least some embodiments, the desktop apparatus 120 additionally includes a power output 152 that controllably provides power for external devices, such as, a task light 150. For an embodiment, the power is provided to the external device only when occupancy of the desktop is sensed. Otherwise, the power is not activated to save power.

Figure 2:
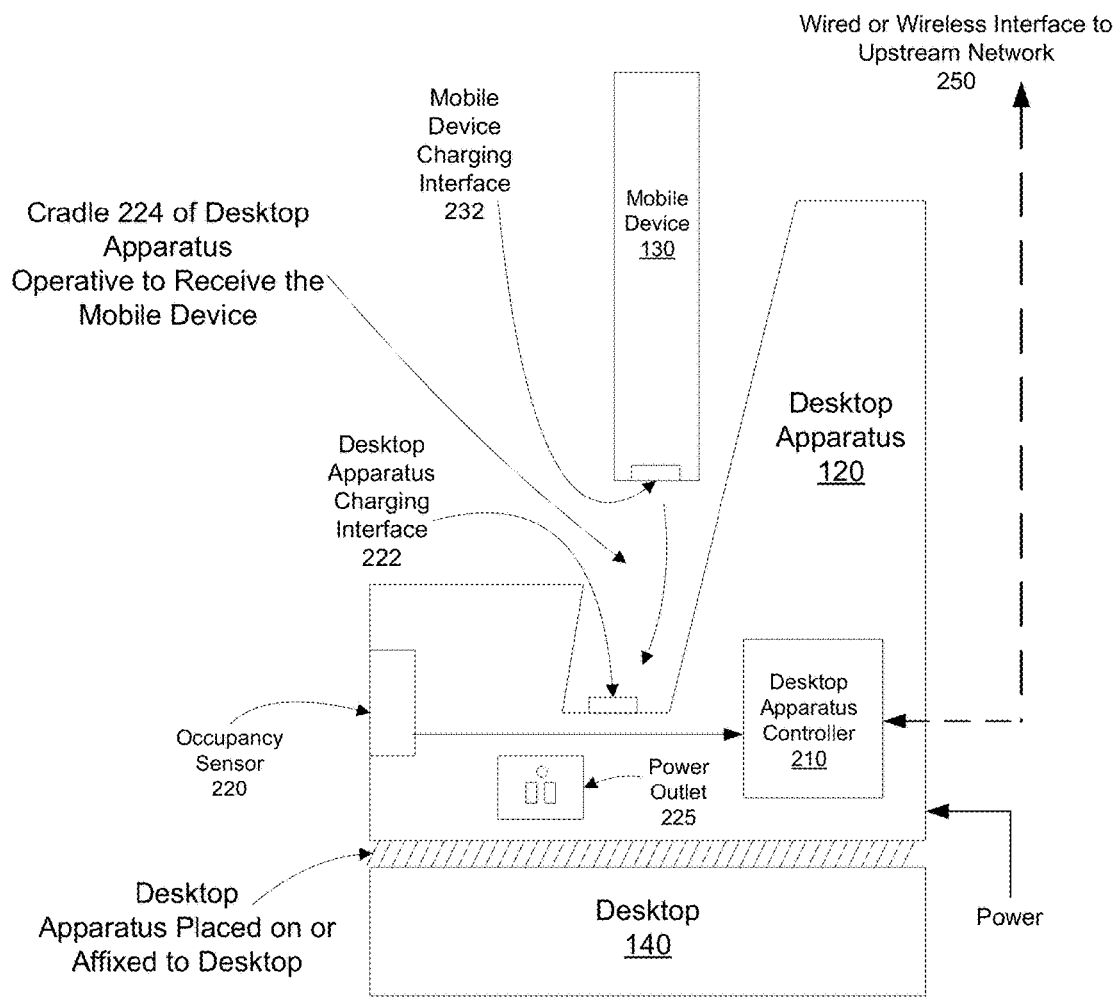
FIG. 2 shows a desktop apparatus, according to an embodiment.

FIG. 2 shows a desktop apparatus 120, according to an embodiment. For at least some embodiments, the desktop apparatus 120 includes an occupancy sensor 220, a controller 210, and a cradle 224 that includes a charging interface 222. For at least some embodiments, the cradle 224 is configured to receive the mobile device 130. Further, when the mobile device 130 is placed within the cradle 224, a charging interface 232 of the mobile device 130 mates with the charging interface 222 of the desktop apparatus 120, which provides an electrical connection between the charging interface 232 of the mobile device 130 and the charging interface 222 of the desktop apparatus 120. Accordingly, when the mobile device 130 is placed in the cradle 224, the desktop apparatus 120 operates to charge a battery of the mobile device 130. The desktop apparatus 120 receives electrical power which is used to power the desktop apparatus 120 and provide electrical power for charging the mobile device 130.

As previously described, for at least some embodiments, the desktop apparatus 120 is affixed to the desktop 140. The desktop apparatus 120 can be affixed to the desktop 140 through at least one of many different possible configurations. For example, the desktop apparatus 120 can be adhesively attached to the desktop 140. Alternatively, the desktop apparatus 120 can be screwed or nailed to the desktop 140. Alternatively, the desktop apparatus 120 apparatus is placed on the desktop 140, but not necessarily attached to the desktop 140.

For at least some embodiments, the controller 210 of the desktop apparatus 120 is interfaced within an upstream network or controller 250. Accordingly, the upstream network 250 can track and monitor occupancy of the desktop 140. For an embodiment, occupancy of a plurality of desktops is monitored. For at least some embodiments, the monitoring provides intelligence and control of the desktops and/or intelligence and control of areas associated with the desktops.

For at least some embodiments, the desktop apparatus 120 further includes a power outlet 225 that controllably provides power based on sensed occupancy by the desktop apparatus 120. As previously described, the power outlet 225 can controllably provide power to external devices based on sensing of occupancy of the desktop 140.

Figure 3:
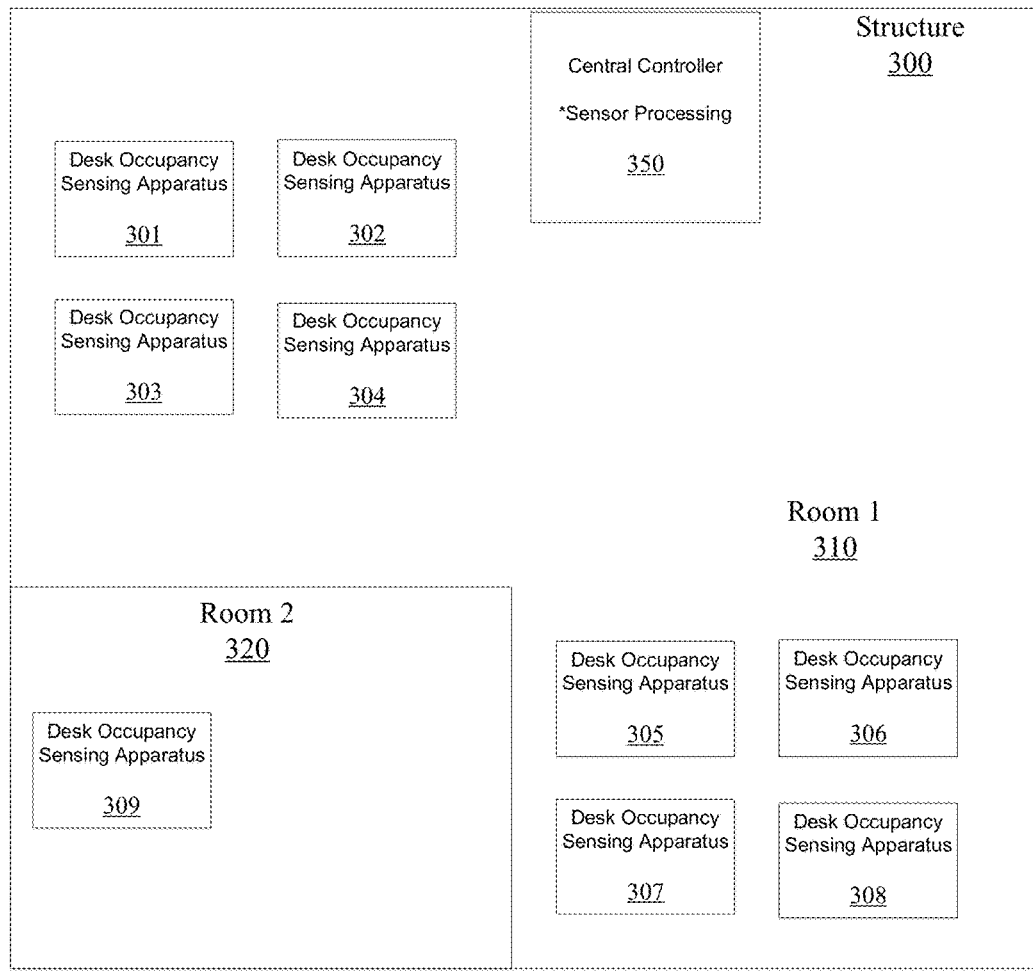
FIG. 3 shows a structure that includes a plurality of desktops having a plurality of desktop apparatuses, according to an embodiment.

FIG. 3 shows a plurality of desktops having a plurality of desktop sensors 301, 302, 303, 204, 305, 306, 307, 308, 309, according to an embodiment. For an embodiment, the plurality of desktop sensors 301, 302, 303, 204, 305, 306, 307, 308, 309 are each affixed to a corresponding desktop, within rooms 310, 320 of a structure 300. Further, for an embodiment, each of the plurality of desktop sensors 301, 302, 303, 204, 305, 306, 307, 308, 309 is wired or wirelessly interfaced with a central controller 350. The interface may be direct, or indirect through other desktop sensors.

For an embodiment, the central controller 350 monitors the occupancy sensed by each of the desktop sensors 301, 302, 303, 204, 305, 306, 307, 308, 309. For at least some embodiments, the central controller 350 uses the occupancy information and/or identification of the users to manage the use or occupancy of the desktops. Further, for at least some embodiments, the central controller 350 intelligently provides direction to one or more users based on tracking and/or monitoring occupancy.

Figure 4:
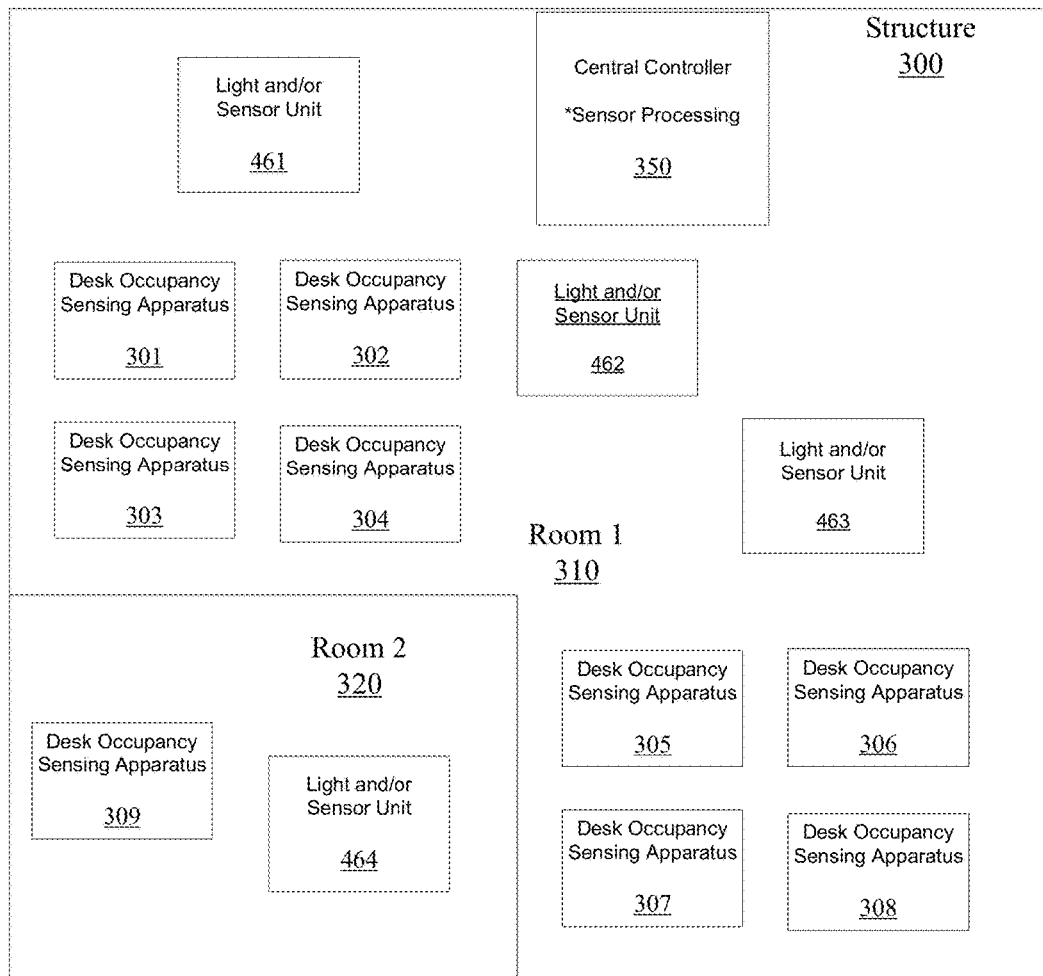
FIG. 4 shows a structure that includes a plurality of desktop apparatuses and a plurality of building fixtures, according to at least some embodiments.

FIG. 4 shows a structure that includes a plurality of desktop sensors 301, 302, 303, 204, 305, 306, 307, 308, 309 and a plurality of building fixtures 461, 462, 463, 464, according to at least some embodiments. An embodiment includes the central controller 350 being interfaced with each of the desktop sensors 301, 302, 303, 204, 305, 306, 307, 308, 309 and each of the building fixtures 461, 462, 463, 464. The interface can be direct or indirect (that is, the connected through an intermediate device). The interfaces can be wired or wireless. For an embodiment, a plurality of building fixtures, and a plurality of other desktop apparatuses form a wireless mesh network, and wherein the plurality of building fixtures communicate sensed information and the plurality of other desktop apparatuses also communicate a sensed occupancy to an upstream network or the central controller 350.

For an embodiment, the upstream network (or central controller 350) operates to identify users that occupy one or more desktops associated with at least one of the desktop apparatus or the other desktop apparatuses. The identification can be obtained through the mobile device of each user. Based on the sensed occupancy and the obtained identification of the user occupying a desktop, the upstream network can provide user-specific intelligence and control. For example, the upstream network can identify personal characteristics of a user, such as, preferences. For example, the upstream network can identify temperature, lighting, and/or location preferences of the user. Based on these identified preferences, the upstream network can accordingly control parameters of the structure, such as, setting the lighting and/or temperature of the structure based on the user preferences. Further, the upstream network can identify desktops locations that are available to a user, and direct the user to particular desktops based on the identified preferences of the users. Further, the upstream network can direct a user to a desktop location for increasing productivity of users. For example, the upstream network may direct particular users to be proximate to engineer interactions between users that would improve productivity of the particular users.

For an embodiment, the upstream network (or central controller 350) operates to communicate with at least one of the identified users through a mobile device of the at least one identified user. The communication can be facilitated by a cellular network, a WiFi network, and/or a Bluetooth Network.

As previously described, for an embodiment, the upstream network (or central controller 350) operates to direct the at least one identified user to one or more specific desktops. The directions can be based on preferences of the user or based on controlled management of the user.

For an embodiment, the upstream network (or central controller 350) operates to direct the at least one identified user to one or more specific desktops based on an identified group that the at least one identified user is determined to be associated with. That is, for example, particular areas of a structure may be primarily occupied by people of a particular organization. Therefore, users of the particular organization may be directed to desktops or cubicles or the particular organization. Additionally, or alternatively, and organization may desire interactions with another organization. Users of the organization may be directed accordingly. Different users may be directed to specific desktops or locations of desktops to engineer interactions.

For an embodiment, the upstream network (or central controller 350) operates direct the at least one identified user to one or more specific desktops based on past tracked behavior of the at least one identified user. Preferences and behavior patterns of users can be identified by tracking and monitoring behaviors of the users. For example, a user may be identified to preferring natural light, locations far from pedestrian traffic, or locations where audible noise is very low. Other users may be identified to preferring completely different factors. However, the tracked and monitored occupancy can be used to identify the preferences, and direct users to desktop to satisfy the preferred preferences. The directing can include providing directions to the user through a mobile device of the user. At least some embodiments can additionally identify whether the user actually occupies the desktop the user was directed to.

For an embodiment, the upstream network (or central controller 350) operates to control power associated with one or more specific desktops, or lighting associated with one or more specific desktops based on how the upstream network determined how to direct the at least one identified user to one or more specific desktops. By knowing which desktops are occupied, powering of lighting or electrical supplies for unoccupied desktop can be deactivated. Further, by directing user to particular desktops, available desktops can be managed to allow for deactivation numbers of desktops and deactivating lighting and temperature of areas associated with the unoccupied desktops.

For an embodiment, the upstream network (or central controller 350) operates confirm occupancy sensed by the desktop apparatus (at least one of the desktop apparatuses 301-309) based on sensed motion of one or more of the plurality of building fixtures (461-464). That is, an area of a structure may include both building fixtures that include motion and/or occupancy sensors. Further, desktop sensors associated with desktops within the area include occupancy sensors. Accordingly, the motion sensors of the building fixtures can be used to confirm occupancy suggested by an occupancy sensor of a desktop apparatus. This information can be used to confirm operation of the occupancy sensor of the desktop apparatus. For example, and faulty occupancy sensor of the desktop apparatus may be identified based on motion sensing of a building fixture. Further, motion patterns of desktop occupants can be identified based on correlations of the occupancy sensors of the desktop apparatuses and motion sensors of the building fixtures. Accordingly, building control can be enhanced.

Figure 5:
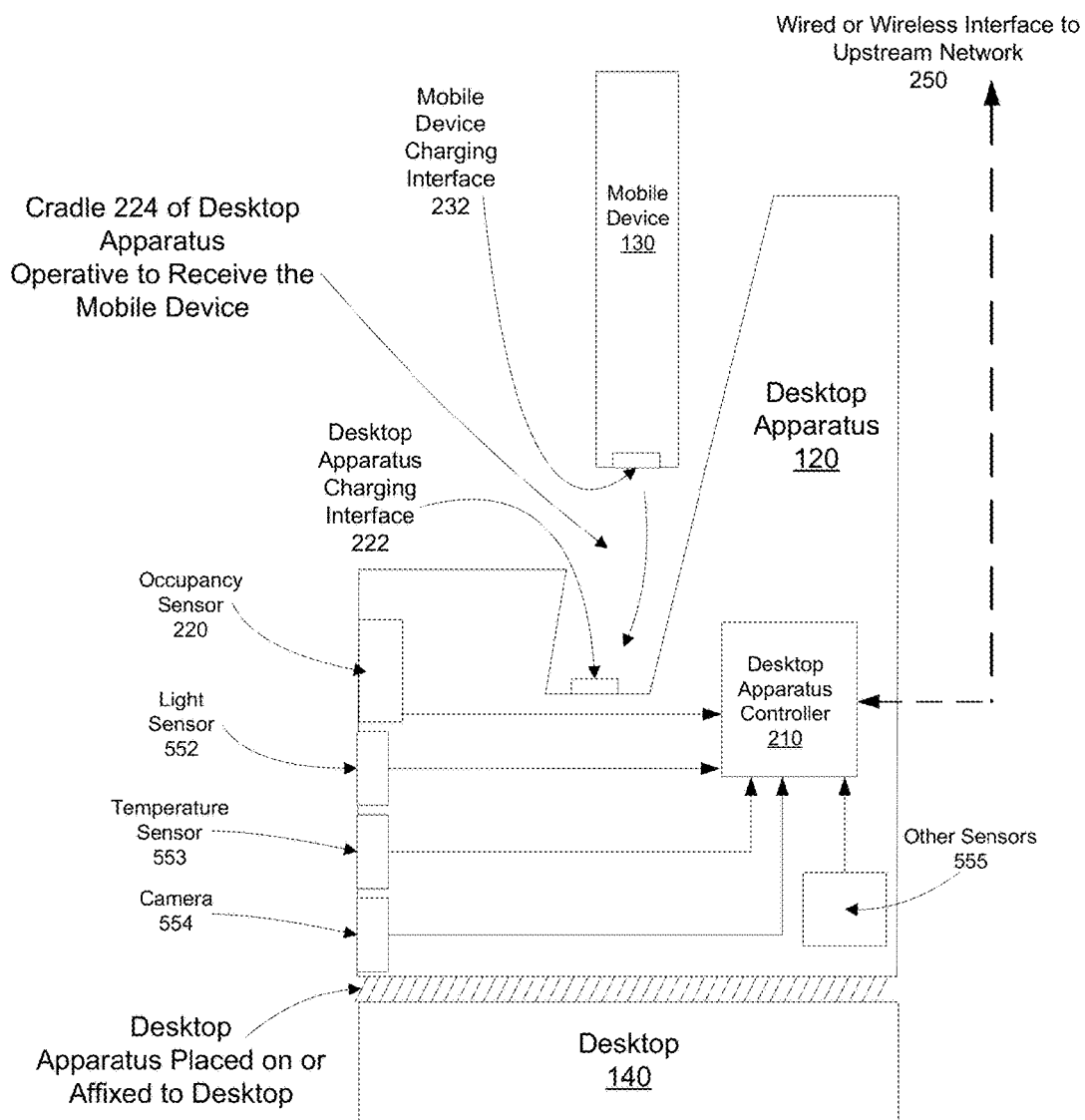
FIG. 5 shows another desktop apparatus, according to an embodiment.

FIG. 5 shows another desktop apparatus 120, according to an embodiment. This embodiment includes additional sensors. For example, additional sensors can include a light sensor 552, a temperature sensor 553, and/or a camera 554. Another separate sensor 555 is shown which can include any one or more of other possible sensors (such as, a barometric pressure sensor, a vibration sensor, etc.).

Locating light and/or temperature sensors 552, 553 proximate to the location of a user of the desktop 140 can be advantageous because the sensors are very near the user, and at the same elevation. That is, if the sensor is located at the ceiling of a structure that includes the desktop, the temperature sensed may not accurately reflect the temperature experienced by the user. Further, lighting sensed away from the desktop (such as, at the ceiling) may not accurately reflect the lighting level experienced by the user.

A camera 554 may be used to glean additional useful information about the user. Other sensors 555 may be used to measure humidity which can be used to aid comfort of the user, or sense acceleration which could be used to detect motion of the desktop.

Figure 6:
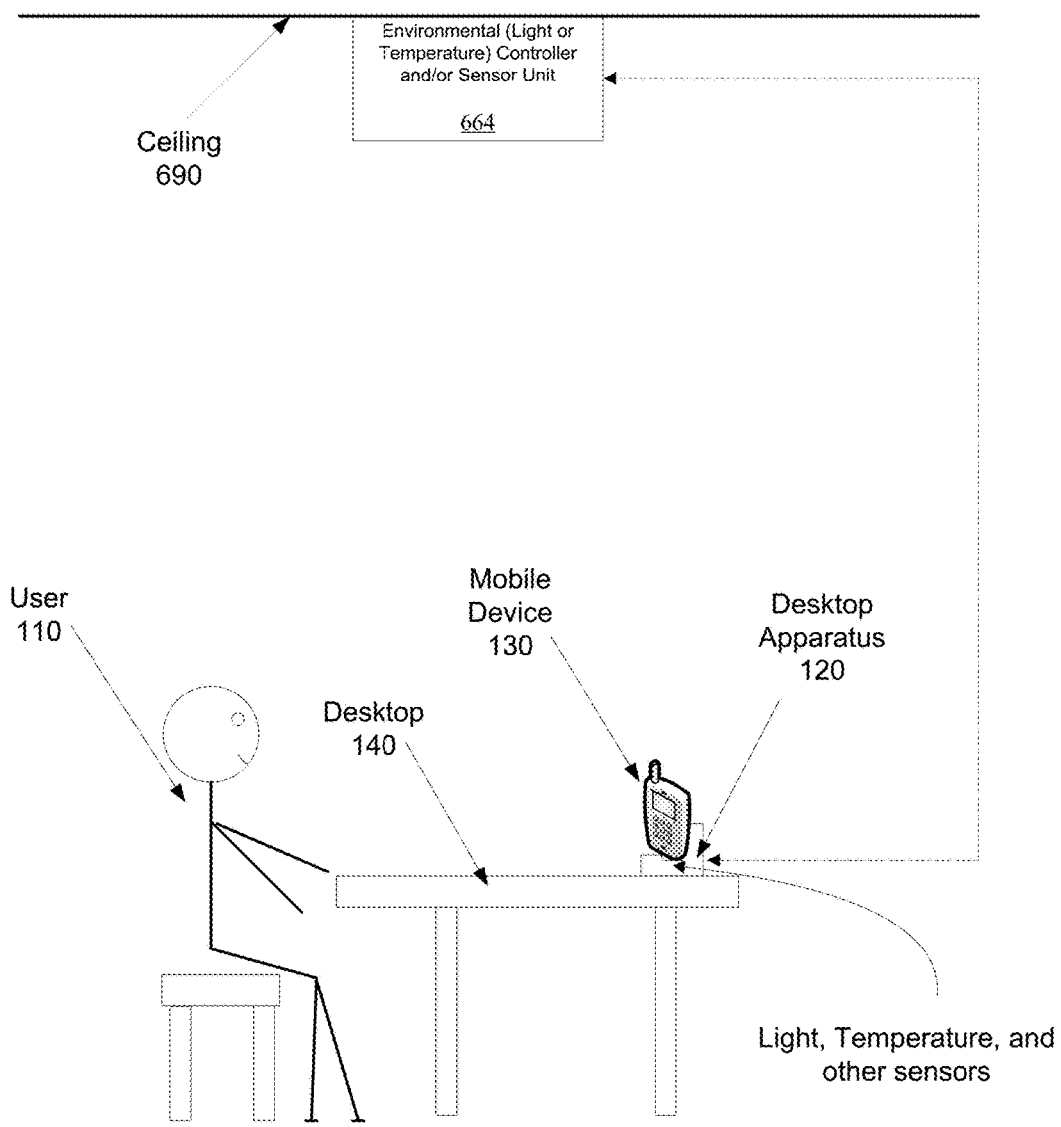
FIG. 6 shows a desktop apparatus interfaced with an environmental controller, according to an embodiment.

FIG. 6 shows a desktop apparatus 120 interfaced with an environmental controller 664, according to an embodiment. For an embodiment, the environmental controller 664 is a building fixture. For an embodiment, the environmental controller 664 is located at a ceiling 690 of a structure. It is to be understood, however, that the environmental controller 664 does not need to be located at the ceiling 690, and can be located anywhere within the structure.

As shown, the desktop apparatus 120 sensing occupancy and/or other sensed information (temperature, light, and/or other parameters) at the desktop 140. Further, for at least some embodiments, at least some of the sensed information is communicated to an upstream controller or the environmental controller 664. The sensed information can be used to control the environment of the user 110. For example, the sensed information can be used to control the level of light being sensed at the desktop apparatus 120. Additionally, or alternatively, the sensed information can be used to control the level of temperature being sensed at the desktop apparatus 120.

For an embodiment, the environmental controller 664 is associated with lighting, and the level of light being sensed at the desktop apparatus 120 at least partially controls the lighting associated with the environmental controller 664.

For an embodiment, the environmental controller 664 is associated with temperature control through, for example an HVAC (heating, ventilation, and air conditioning) system, and the level of temperature being sensed at the desktop apparatus 120 at least partially controls the temperature control (HVAC) associated with the environmental controller 664.

Figure 7:
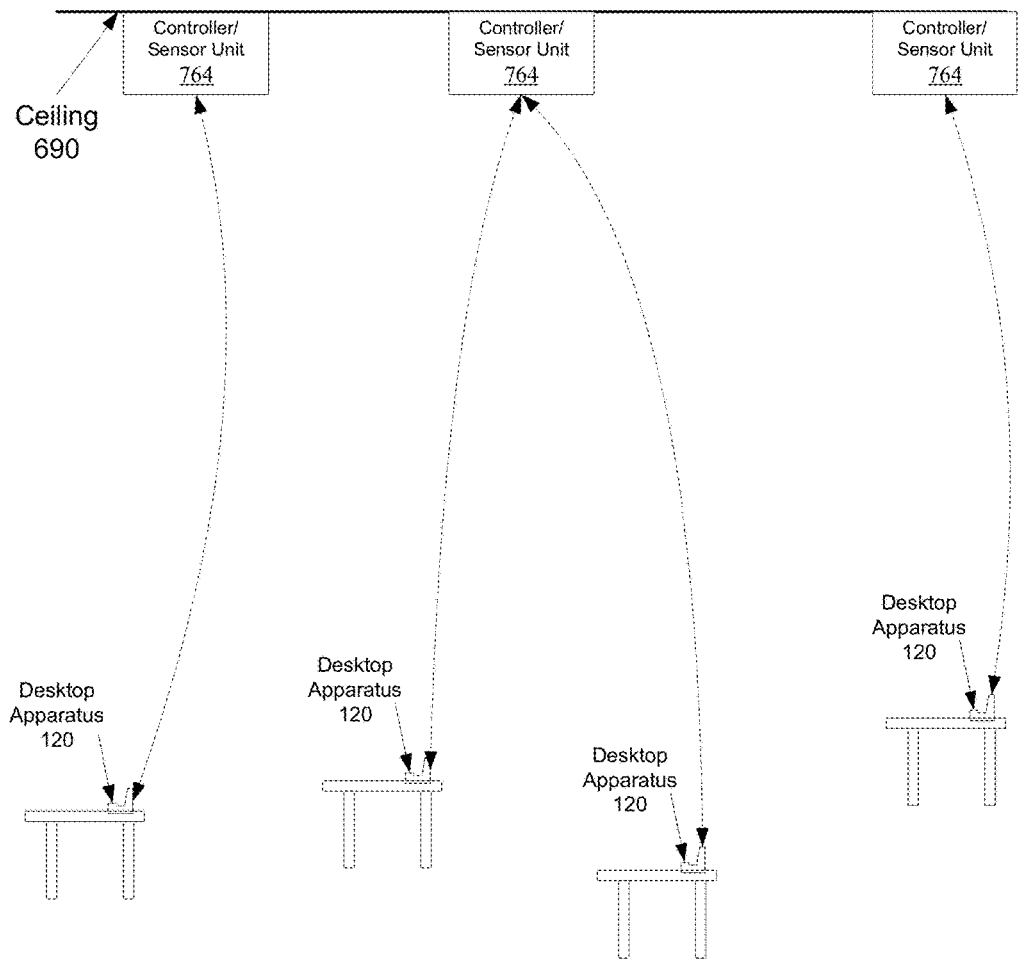
FIG. 7 shows a plurality of desktop apparatuses interfaced with a plurality of environmental controllers, according to an embodiment.

FIG. 7 shows a plurality of desktop apparatuses 140 interfaced with a plurality of environmental controllers 764, according to an embodiment. As previously described, the desktop apparatuses 140 each include at least an occupancy sensor. The sensed occupancy and/or other parameters can be communicated to an upstream controller and/or building fixtures (such as, the controllers 764). As previously described, the sensed information can be used to control one or more power of, temperature, lighting, and/or other conditions of a structure that includes the desktop apparatuses 120.

Further, for at least some embodiments, the building fixtures 764 include additional sensors which can additionally or alternatively be used to control one or more power of, temperature, lighting, and/or other conditions of a structure that includes the desktop apparatuses 120.

Further, for at least some embodiments, one or more of the building fixtures 764 and/or an upstream controller can track users within the structure. For example, the desktop apparatuses 120 can identify a user through a mobile device of the user. Based on the sensed occupancy and the identification of the user, the building fixtures 764 and/or an upstream controller can track the motion and occupancy of the user. This information can be used for controlling the structure and for providing intelligent feedback to the user.

Controlling the structure can include lighting and environmental control that is personalized to the desires or requested of the user. The desired and/or request can be directly received from the user, or inferred based on the users behavior. For example, monitoring and tracking can identify that the user always prefers a located with the greatest or least light, or the greatest or least temperature, or the greatest or least audible levels, or the greatest or least other occupants, or the farthest or closest location to a conference room or an exit.

Managing the user can include directing the user to specific desktop associated with the desktop apparatuses. For example, it may be desirable to located specific users to be proximate to each other thereby engineering interactions that may be useful for a company that occupies the structure. Alternatively, the management may include located specific users to not be located near each other. Further, personal preferences can be used to direct users to locations that include features desired by particular users, such as, natural light or low audible levels.

As previously described, for at least some embodiments, one or more of the desktop apparatuses 120 and the building fixtures 764 and/or an upstream controller can track users within the structure. For an embodiment, the tracking includes sensing occupancy by one or more of the desktop apparatus. Based on the sensed occupancy and knowledge of the physical locations of the desktop apparatuses 120, locations of users can be tracked through the structure.

An embodiment includes auto-commissioning of the desktop apparatuses 120, wherein the location of one or more of the desktop apparatuses 120 is automatically determined. For an embodiment, the previously described interface 250 of a desktop apparatus 120 includes a wireless interface, and the location of the desktop apparatus 120 is automatically determined by either wirelessly transmitting beacons from the desktop apparatus 120 to one or more of the building fixtures 764, or the desktop apparatus 120 wirelessly receiving beacons from one or more of the building fixtures 764. The location of the desktop apparatus 120 apparatus can be estimated based on the signal power of received beacons. That is, by knowing the transmission power level of transmitted beacons, the distance between the desktop apparatus 120 can be estimated based on the received power level of the beacons. For an embodiment, the transmission power level of the beacons is limited to ensure that the distance between the desktop apparatus 120 and the one or more building fixtures 764 is less than a threshold amount. Therefore, if a beacon is received by the desktop apparatus 120 and/or a building fixture 764, then it can be determined that the desktop apparatus 120 is within the threshold distance of the building fixture 764, and the location of the desktop apparatus 120 estimated based on the location of the building fixture. Further, if multiple beacons are received by the desktop apparatus 120 from multiple building fixtures 764, or multiple building fixtures 764 receive beacons from the desktop apparatus 120, the location of the desktop apparatus 120 can be estimated by triangulating the estimated distances between the desktop apparatus 120 and the building fixtures 764. That is, the distances between the desktop apparatus 120 and each of the multiple building fixtures 764 is estimated by the level of attenuation of the transmission power levels of the beacons during air propagation between the desktop apparatus 120 and each of the multiple building fixtures 764. Based on the estimated distances and the know location of the multiple building fixtures 764, triangulation can be used to estimate the location of the desktop apparatus 120.

FIG. 8 is a flow chart that includes steps of a method, according to an embodiment. A first step 810 includes sensing, by an occupancy sensor of a desktop apparatus, occupancy of a desk top associated with the desktop apparatus. A second step 820 includes receiving, by the desktop apparatus, a mobile device at a charging interface of the desktop apparatus. A third step 830 includes communicating, by a controller of the desktop apparatus, the determined occupancy to an upstream network, wherein the occupancy sensor, the charging interface, and an interface to the upstream network are disposed within the structure as a single unit, and wherein the structure is adapted to be affixed to or placed on the desktop.

Figure 9:
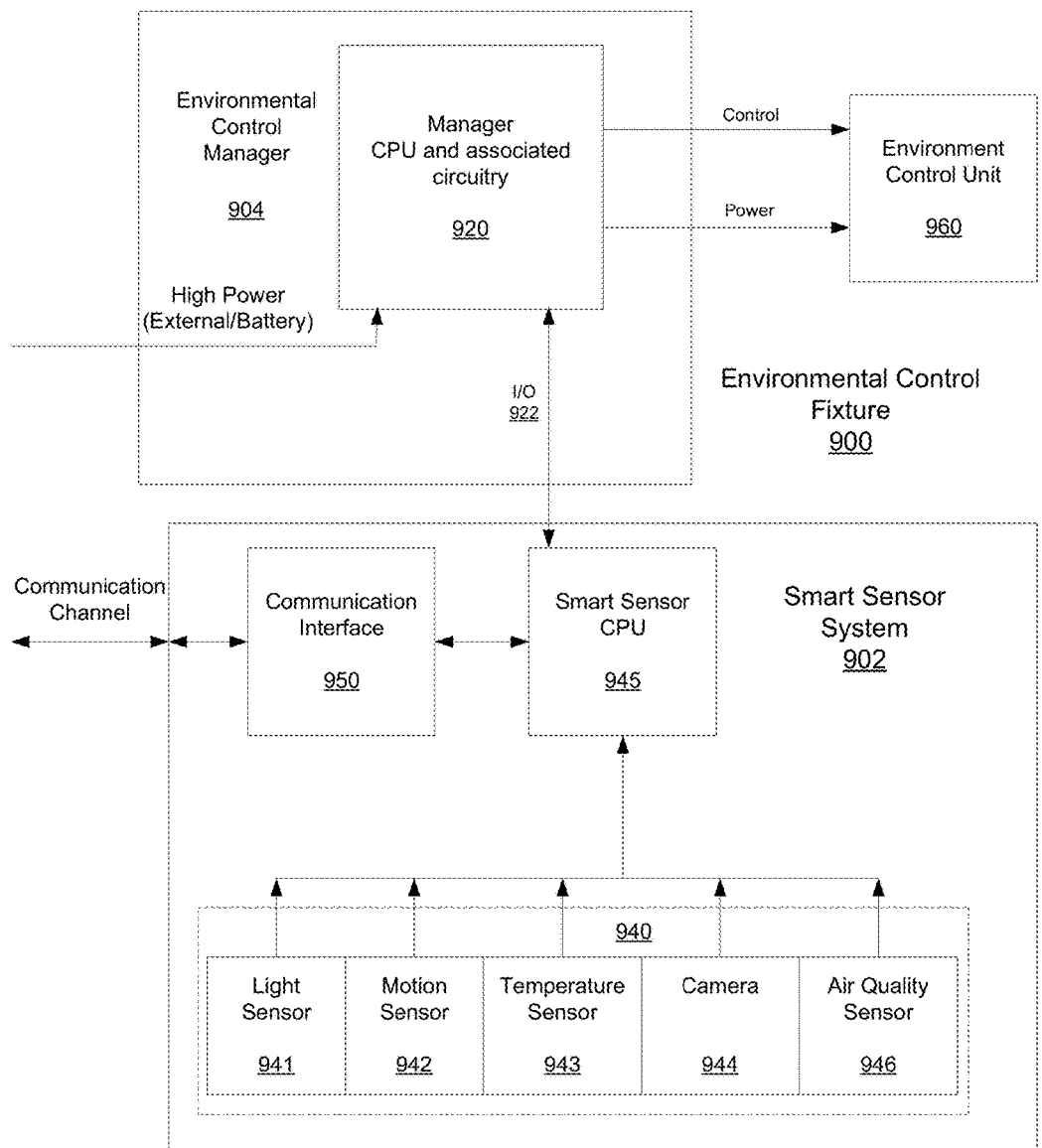
FIG. 9 shows an environmental control subsystem, according to an embodiment.

FIG. 9 shows an environmental control fixture, according to an embodiment. For this embodiment, the building fixture 900 includes a smart sensor system 902 and an environmental control manager 904. While shown as a single environmental control unit 900, wherein an I/O is connected between the smart sensor system 902 and the environmental control manager 904, it is to be understood that the smart sensor system 902 and the environmental control manager 904 do not have to be commonly located. For example, for an embodiment, the smart sensor system 902 is included within at least one of the described desktop apparatuses and the I/O 922 is a communication link between the fixture and the desktop apparatus. For an embodiment, the manager 904 includes a manager CPU 920.

For at least some embodiments, the smart sensor unit 902 includes at least one sensor 940 (such as, a light sensor 941, a motion sensor 942, a temperature sensor 943, a camera 944 and/or an air quality sensor 946), wherein the sensor 940 is operative to generate a sense signal based on at least one of sensed parameter. The building fixture 900 further includes communication circuitry 950. The communication circuitry 950 is operative to maintain a link (the link can be wired or wireless) with a network or one of the previously described desktop apparatus. The building fixture 900 further includes a controller 945. For at least some embodiments, the controller 945 is operative to manage communication with the network, manage transmission of beacons through the communication circuitry, and generate environmental (for example, lighting or temperature) control base on at least one of the sensed signal and communication from the network. For at least some embodiments, the beacons include information associated with the fixture. The environmental control manager 904 is configured to receive the control and operative to a parameter of an environmental control unit 960 of the environmental control fixture 900.

For at least some embodiments, the information within the transmitted beacons that is associated with the fixture includes location information of the fixture. For at least some embodiments, the information associated with the fixture includes an identifier of the fixture.

As previously described, for at least some embodiments, the sensor 940 includes a motion sensor, and wherein managing transmission of the beacons includes triggering transmission of a beacon upon sensing motion by the motion sensor. For an embodiment, the transmission of the beacon is triggered by sensing motion of greater than a predetermined threshold. For at least some embodiments, the environmental control fixture includes a battery, wherein the battery provides electrical power to the environmental control fixture. The triggering of beacons under certain conditions (such as sensing motion) provides power savings over implementations that continuously transmit beacons. This is desirable for battery powered environmental control fixtures.

For at least some embodiments, managing transmission of the beacons includes transmitting beacon continuously over time.

As previously described, for at least some embodiments, managing transmission of the beacons comprises transmitting the beacons with at a transmission signal power level of less than a threshold level, wherein the transmitted beacon cover less than predetermined area. By limiting the power level of the transmitted beacons, the range or distance away from an environmental control fixture in which the mobile device 130 can receive beacons is limited. Therefore, as a first approximation, the location of the mobile device can be assumed to be the location of the environmental control fixture that transmitted the beacon. As the mobile device received beacons from multiple environmental control fixtures, the estimated location of the mobile device can be improved. For an embodiment, the beacons are transmitted using a low-power Blue Tooth transceiver.

For at least some embodiments, a plurality of other environmental control fixtures transmit beacons at a transmission signal power level of less than the threshold, enabling a mobile device to receive beacons from the environmental control fixture and the other environmental control fixtures and estimate a location of the mobile device, wherein estimating the location of the mobile device includes measuring a receive signal strength of the received beacons, estimating a distance between the mobile device and the environmental control fixture and between the mobile device and each of the other environmental control fixtures, and estimating the location by triangulating the estimated distances. For at least some embodiments, each of the environmental control fixture and the other environmental control fixtures transmit the beacons after sensing motion, thereby limiting how many environmental control fixtures transmit beacons.

As previously described, for at least some embodiments, managing the transmission of beacons includes receiving a location request from a mobile device, and responding with transmission of one or more beacons. For at least some embodiments, the transmitted beacons include a location of the environmental control fixture, and wherein the mobile device determines its location based on the location information of the environmental control fixture. For at least some embodiments, the transmitted beacons include an identifier of the environmental control fixture, and wherein the mobile device determines its location by determining a location of the environmental control fixture based on the identifier. For example, for an embodiment, the mobile device accesses the location based on the identified and known location(s) of the environmental control fixture(s). At least some embodiments further include supplementing the location determination with RSSI (receive signal strength indicator) measurements between the mobile device and the environmental control fixture.

For at least some embodiments, the environmental control fixture is further operative to receive a broadcast message from a central controller, wherein reception of the broadcast message puts the environmental control fixture into a known condition, wherein putting the environmental control fixture in the known condition communicates to a user that the environmental control fixture is prepared for commissioning, establishing, through the managed transmission of the beacons, communication between the environmental control fixture and a mobile device of the user, and communicating, by either the environmental control fixture or the mobile device, a location of the user at a time of the established communication, to the central controller, thereby allowing the central controller to record a location of the environmental control fixture.

Although specific embodiments have been described and illustrated, the described embodiments are not to be limited to the specific forms or arrangements of parts so described and illustrated. The embodiments are limited only by the appended claims.

The invention claimed is:

1. A desktop apparatus, comprising:
an occupancy sensor, wherein the occupancy sensor operates to sense occupancy proximate to the desktop apparatus;
a mobile device charging interface;
a controller, wherein the controller operates to determine occupancy of a desktop based on the sensed occupation, and wherein the controller operates to communicate the determined occupancy to an upstream network;
a structure, wherein the occupancy sensor, the mobile device charging interface, and an interface to the upstream network are disposed within the structure as a single unit; and
wherein the structure is adapted to be placed on or affixed to the desktop;
wherein the desktop apparatus, a plurality of building fixtures, and a plurality of other desktop apparatuses form a wireless network, and wherein the plurality of building fixtures communicate sensed information and the plurality of other desktop apparatuses also communicate a sensed occupancy to the upstream network;
wherein the upstream network operates to identify users that occupy one or more desktops associated with at least one of the desktop apparatus or the other desktop apparatuses;
wherein the upstream network operates to communicate with at least one of the identified users through a mobile device of the at least one identified user; and
wherein the upstream network operates to direct the at least one identified user to one or more specific desktops.

2. The apparatus of claim 1, wherein the occupancy sensor comprises a PIR (passive infrared sensor).

3. The apparatus of claim 1, wherein the occupancy sensor comprises an ambient light sensor.

4. The apparatus of claim 1, wherein the occupancy sensor comprises an RF (radio frequency) receiver, and occupancy is determined by successful communication between the RF receiver and a mobile device of an occupant.

5. The apparatus of claim 1, further comprising a temperature sensor.

6. The apparatus of claim 1, further comprising a wired or wireless network interface for interfacing the apparatus to the upstream network.

7. The apparatus of claim 1, wherein the mobile device charging interface comprises a cradle adapted to receive and electrically charge a mobile device.

8. The apparatus of claim 1, wherein controller operates to communicate with the upstream network through a building fixture, another desktop apparatus, or a wireless access point.

9. The apparatus of claim 1, wherein the controller is further operative to communicate with a building fixture.

10. The apparatus of claim 9, wherein the building fixture comprises a plurality of sensors, and the building fixture is further operative to sense motion.

11. The apparatus of claim 10, wherein the building fixture is further operative to provide environmental control based on sensed occupancy of the apparatus or the sensed motion of the building fixture.

12. The apparatus of claim 1, wherein the upstream network operates to direct the at least one identified user to one or more specific desktops based on an identified group that the at least one identified user is determined to be associated with.

13. The apparatus of claim 1, wherein the upstream network operates to direct the at least one identified user to one or more specific desktops based on past tracked behavior of the at least one identified user.

14. The apparatus of claim 1, wherein the upstream network operates to control power associated with one or more specific desktops, or lighting associated with one or more specific desktops based on how the upstream network determined how to direct the at least one identified user to one or more specific desktops.

15. A desktop apparatus, comprising:
an occupancy sensor, wherein the occupancy sensor operates to sense occupancy proximate to the desktop apparatus;
a mobile device charging interface;
a controller, wherein the controller operates to determine occupancy of a desktop based on the sensed occupation, and wherein the controller operates to communicate the determined occupancy to an upstream network;
a structure, wherein the occupancy sensor, the mobile device charging interface, and an interface to the upstream network are disposed within the structure as a single unit; and
wherein the structure is adapted to be placed on or affixed to the desktop;
wherein the desktop apparatus, a plurality of building fixtures, and a plurality of other desktop apparatuses form a wireless network, and wherein the plurality of building fixtures communicate sensed information and the plurality of other desktop apparatuses also communicate a sensed occupancy to the upstream network; and
wherein the upstream network operates to confirm occupancy sensed by the desktop apparatus based on sensed motion of one or more of the plurality of building fixtures.

16. A method, comprising:
sensing, by an occupancy sensor of a desktop apparatus, occupancy of a desk top associated with the desktop apparatus;
receiving, by the desktop apparatus, a mobile device at a charging interface of the desktop apparatus;
communicating, by a controller of the desktop apparatus, the determined occupancy to an upstream network; wherein
the occupancy sensor, the charging interface, and an interface to the upstream network are disposed within the structure as a single unit; and
wherein the structure is adapted to be affixed to the desktop;
wherein the desktop apparatus, a plurality of building fixtures, and a plurality of other desktop apparatuses form a wireless network, and wherein the plurality of building fixtures communicate sensed information and the plurality of other desktop apparatuses also communicate a sensed occupancy to the upstream network;
wherein the upstream network operates to identify users that occupy one or more desktops associated with at least one of the desktop apparatus or the other desktop apparatuses;
wherein the upstream network operates to communicate with at least one of the identified users through a mobile device of the at least one identified user; and
wherein the upstream network operates to direct the at least one identified user to one or more specific desktops.

* * * * *